United States Patent
Michels et al.

(10) Patent No.: US 6,678,269 B1
(45) Date of Patent: Jan. 13, 2004

(54) NETWORK SWITCHING DEVICE WITH DISPARATE DATABASE FORMATS

(75) Inventors: Timothy Scott Michels, Spokane, WA (US); Jayasenan Sundara Ganesh, Veradale, WA (US); James E. Cathey, Greenacres, WA (US); Michael Dale Helbling, Spokane, WA (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/166,620

(22) Filed: Oct. 5, 1998

(51) Int. Cl.[7] .............................................. H04L 12/56
(52) U.S. Cl. ..................... 370/389; 370/401; 370/471
(58) Field of Search ................................ 370/389, 392, 370/395.1, 396, 397, 400, 401, 412, 428, 429, 352, 368, 465, 469, 471, 395.31, 395.32, 470; 709/238, 230

(56) References Cited

U.S. PATENT DOCUMENTS

| | | | |
|---|---|---|---|
| 4,201,890 A | * 5/1980 | Lawrence et al. | 370/362 |
| 5,214,639 A | 5/1993 | Herion | |
| 5,386,413 A | 1/1995 | McAuley et al. | |
| 5,414,704 A | * 5/1995 | Spinney | 370/389 |
| 5,459,724 A | 10/1995 | Jeffrey et al. | |
| 5,566,170 A | * 10/1996 | Bakke et al. | 370/392 |
| 5,608,726 A | 3/1997 | Virgile | |
| 5,748,905 A | * 5/1998 | Hauser et al. | 709/249 |
| 5,796,944 A | 8/1998 | Hill et al. | |
| 5,895,500 A | 4/1999 | Thomason et al. | |
| 5,905,725 A | 5/1999 | Sindhu et al. | |
| 5,909,440 A | * 6/1999 | Ferguson et al. | 370/389 |
| 5,909,686 A | 6/1999 | Muller et al. | |
| 5,938,736 A | * 8/1999 | Muller et al. | 709/243 |
| 5,946,679 A | * 8/1999 | Ahuja et al. | 707/3 |
| 6,006,306 A | 12/1999 | Haywood et al. | |
| 6,011,795 A | 1/2000 | Varghese et al. | |
| 6,023,466 A | * 2/2000 | Luijten et al. | 370/395.31 |
| 6,032,190 A | 2/2000 | Bremer et al. | |
| 6,081,522 A | 6/2000 | Hendel et al. | 370/389 |
| 6,161,144 A | * 12/2000 | Michels et al. | 709/238 |
| 6,185,552 B1 | * 2/2001 | Delong et al. | 707/3 |
| 6,208,649 B1 | * 3/2001 | Kloth | 370/392 |
| 6,259,699 B1 | 7/2001 | Opalka et al. | |
| 6,275,861 B1 | * 8/2001 | Chaudri et al. | 709/238 |

OTHER PUBLICATIONS

U.S. patent application Ser. No. 09/166,343, Johnson et al.
U.S. patent application Ser. No. 09/166,603, Michels et al.
U.S. patent application Ser. No. 09/776,940, Michels et al.

* cited by examiner

*Primary Examiner*—Douglas Olms
*Assistant Examiner*—Brian Nguyen
(74) *Attorney, Agent, or Firm*—Michael Blaine Brooks, PC; Andrew Naglestad; David A. Cordeir (57) ABSTRACT

A switching device for forwarding network traffic to a desired destination on a network, such as a telephone or computer network. The switching device includes multiple ports and uses a lookup table containing lookup keys to determine which port to forward network traffic over. The lookup table includes disparate forwarding databases that contain database entries in different formats. For example, one forwarding databases may relate to MAC addresses, while another database relates to IP addresses. The disparate databases are maintained in a single lookup table and a binary search engine searches the table without regard to the database format. Like-kind database entries are grouped within the lookup table and the lookup table is maintained in sorted order by prepending format identification bits to the lookup keys. Memory availability for the disparate databases can be dynamically changed allowing customization for a particular user application. Consequently, memory can be efficiently used and reallocated if needed.

16 Claims, 6 Drawing Sheets

FIG. 1A
(PRIOR ART)

| NETWORK ADDRESS | PORTS |
|---|---|
| A | 1 |
| M | 3 |
| N | 3 |
| H | 2 |
| F | 2 |
| J | 2 |

NETWORK SWITCHING DEVICE WITH DISPARATE DATABASE FORMATS

FIELD OF THE INVENTION

This invention relates generally to networks, such as telephone and computer networks, and, more particularly, relates to routing information through such networks.

BACKGROUND OF THE INVENTION

A network allows two or more parties to communicate with each other. In their simplest form, networks generally include transmission lines and switching devices (e.g., routers, switching routers, switches, etc.). The transmission lines carry signals (e.g., electrical, optical, etc.), while the switching devices are intermediate stations that establish temporary connections between transmission lines. In telephone networks, for example, a caller's line goes to a switching device where the actual connection is made to the called party. In computer networks, devices such as routers receive messages on the network and forward the messages to their correct destinations. Computer networks can be as small as a local area network (LAN) consisting of a few computers, printers, and other devices, or it can consist of many computers distributed over a vast geographical area (e.g., the Internet).

Figure 1A:
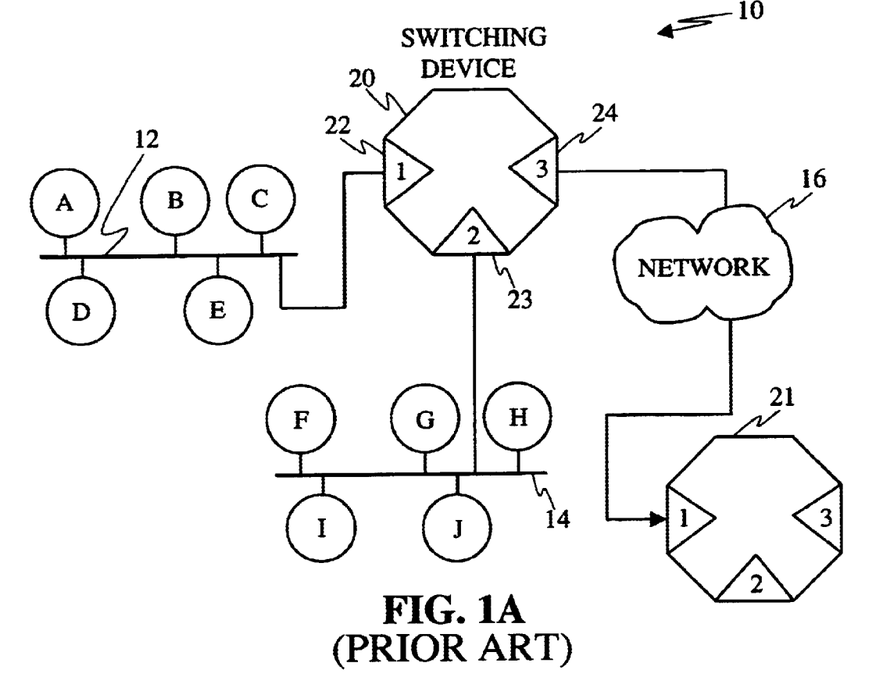
FIG. 1A shows a known network containing multiple segments connected through a switching device.
Figure 1B:
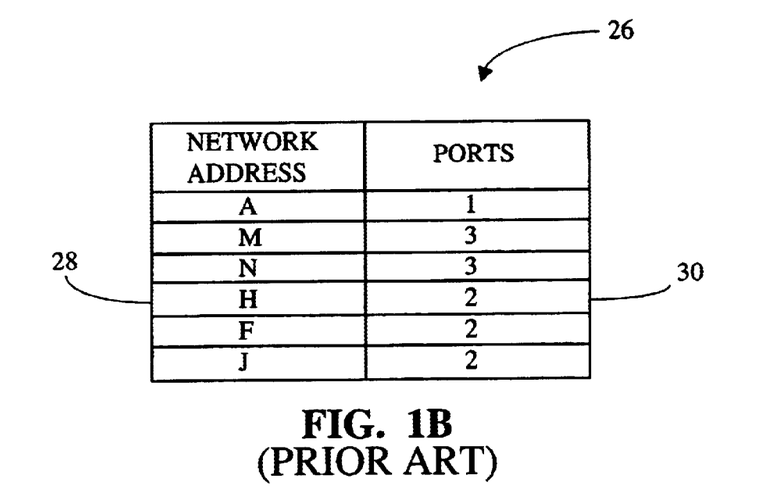
FIG. 1B shows a known lookup table stored in the switching device for identifying nodes connected to the segments.

An example computer network 10 is shown in FIG. 1A. The network includes two local segments 12 and 14, and connection to a remote network 16. Nodes, labeled as A–J, represent computers connected to the local segments. A switching device 20 includes three ports 22–24 and switches network traffic between segments 12, 14, and the remote network 16. Network 16 may also include switching devices, such as switching device 21, which then connects other segments (not shown) to the network. Switching device 20 allows the nodes on one segment to communicate with nodes on other segments and to other switching devices. The nodes communicate with each other through a protocol (e.g., HTTP, TCP/IP, SMB, etc.) which allows the nodes to transmit and receive network frames (a network frame includes a destination address, a source address, and a data field). When switching device 20 receives a frame from a node, it analyzes the destination address by searching a lookup table 26, shown in FIG. 1B. Lookup table 26 includes table entries having a network address field and a port field. When the destination address is matched to a network address in the lookup table, switching device 20 determines which port to forward the frame to by obtaining the port number corresponding to the matched network address. For example, if node A on segment 12 sends a message to node H on segment 14, switching device 20 receives the message from node A and in response searches the entries in the network address field of lookup table 26. Table entry 28 contains the network address for H. A corresponding port field 30 for network address H indicates that the frame should be forwarded over port 2. Additional background information on switches can be found in a number of references, such as Fast Ethernet (1997) by L. Quinn et al., *Computer Networks* (3$^{rd}$ Ed. 1996 by A. Tannenbaum, and *High-Speed Networking with LAN Switches* (1997) by G. Held, all of which are incorporated herein by reference.

The switching device can obtain the network addresses for the lookup table in different ways, depending on the particular implementation of the switching device. For example, the switching device may snoop network traffic so that when a frame is received on a port, the switching device determines if the frame's source address is in the table and, if it is not, adds an entry containing the source address and the inbound port to the table. Thus, the switching device is said to "learn" addresses and port numbers from any frame that is transmitted by a node. Another technique some switching devices, such as routers, use to obtain the lookup table is from other switching devices through a special protocol. Thus, routers supply network addresses to each other to supplement their lookup tables.

Figure 2:
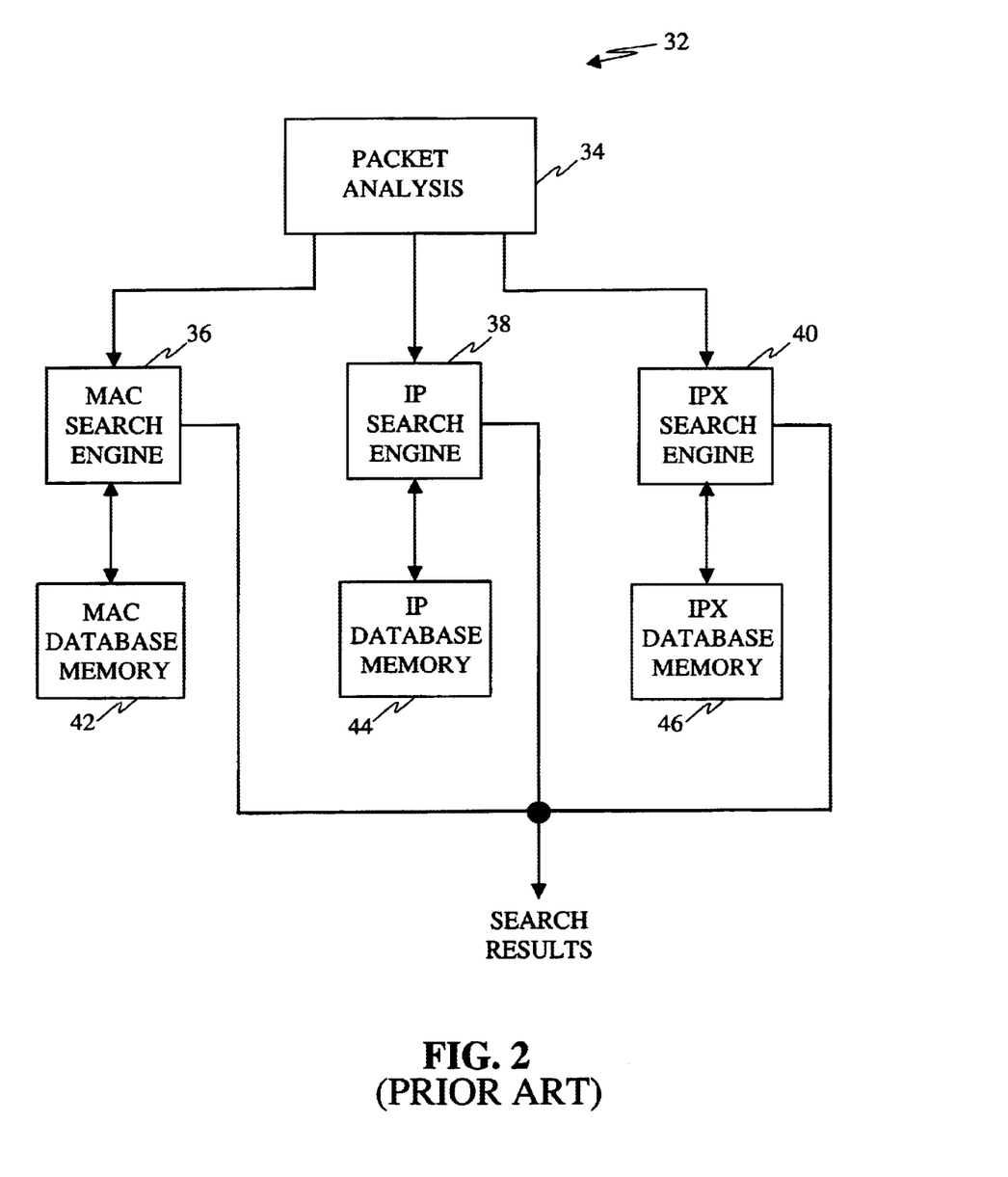
FIG. 2 shows a prior art switching device supporting multiple database formats.

Some switching devices need to be able to forward network frames having different data frame formats. For example, a switching device may forward network frames containing MAC addresses (48 bit address), IP addresses (32 bit addresses), IPX addresses (32), IPV6 addresses (128 bits), etc. FIG. 2 shows a prior art switching device 32 that forwards frames of different formats. A packet analysis circuit 34 receives a network frame and analyzes its format. Based on the analysis, the packet analysis circuit forwards address information from the network frame onto either a MAC search engine 36, an IP search engine 38, or an IPX search engine 40. Each search engine 36, 38, and 40 has access to its own independent memory 42, 44, and 46, respectively, which store forwarding information in the appropriate format for its search engine. When one of these search engines receives the address information, they perform a search on their memory and pass forwarding information obtained from the search onto other forwarding logic in the switch.

Using such a prior art switch has several drawbacks. First, the switch requires a separate search engine and separate memory for each different database format, which is costly and inefficient. Second, the memories must be sufficiently sized so that there is adequate memory space for each database format, even though a particular user may only require a few entries having one format. For example, a user may only require a few MAC database entries, while requiring excessive IP entries. In such a case, the memory containing MAC entries has wasted memory locations, while the memory storing IP entries is overloaded. Also, currently there is no way to reallocate some of the extra IP entries into the spare memory locations in the MAC database.

An objective of the present invention, therefore, is to provide a highspeed network switching device that can quickly and efficiently search through an address lookup table and that supports multiple database formats.

SUMMARY OF INVENTION

The present invention provides a switching device (e.g., router, switch, switching router, etc.) that forwards network traffic to a desired destination on a network, such as a telephone or computer network. The switching device includes multiple ports and uses a lookup table to determine which port to forward network traffic over. The network traffic is typically in the form of network frames that include source and destination addresses.

In one aspect of the invention, a single lookup table can store multiple database formats for supporting different network protocols (e.g., MAC, IP, IPX, IPV6, Appletalk, etc.). The different database formats require addresses and forwarding information of different lengths. Additionally, a single search engine may be used to search the lookup table in order to obtain the forwarding information.

In another aspect of the invention, the different database formats are grouped into separate sections of memory, rather than intermingled, by prepending format identification bits to the most significant bit position of the keys stored in the lookup table. As a result, the search engine can perform the same search regardless of the database format.

Thus, the invention allows for a multi-database, single memory system wherein the size of the database formats can be customized and changed dynamically for a particular user. Additionally, memory space is not a fixed size for each database format, but, instead, can be changed to allow the databases to differ in size and for the size to dynamically change (i.e., the database sizes change while the switch is operational). Additionally, the search engine algorithm is simplified since it views the entire memory as a single database without regard to the disparate database formats contained therein.

These advantages and other advantages and features of the inventions will become apparent from the following detailed description, which proceeds with reference to the following drawings.

DETAILED DESCRIPTION OF AN ILLUSTRATIVE EMBODIMENT

Figure 3:
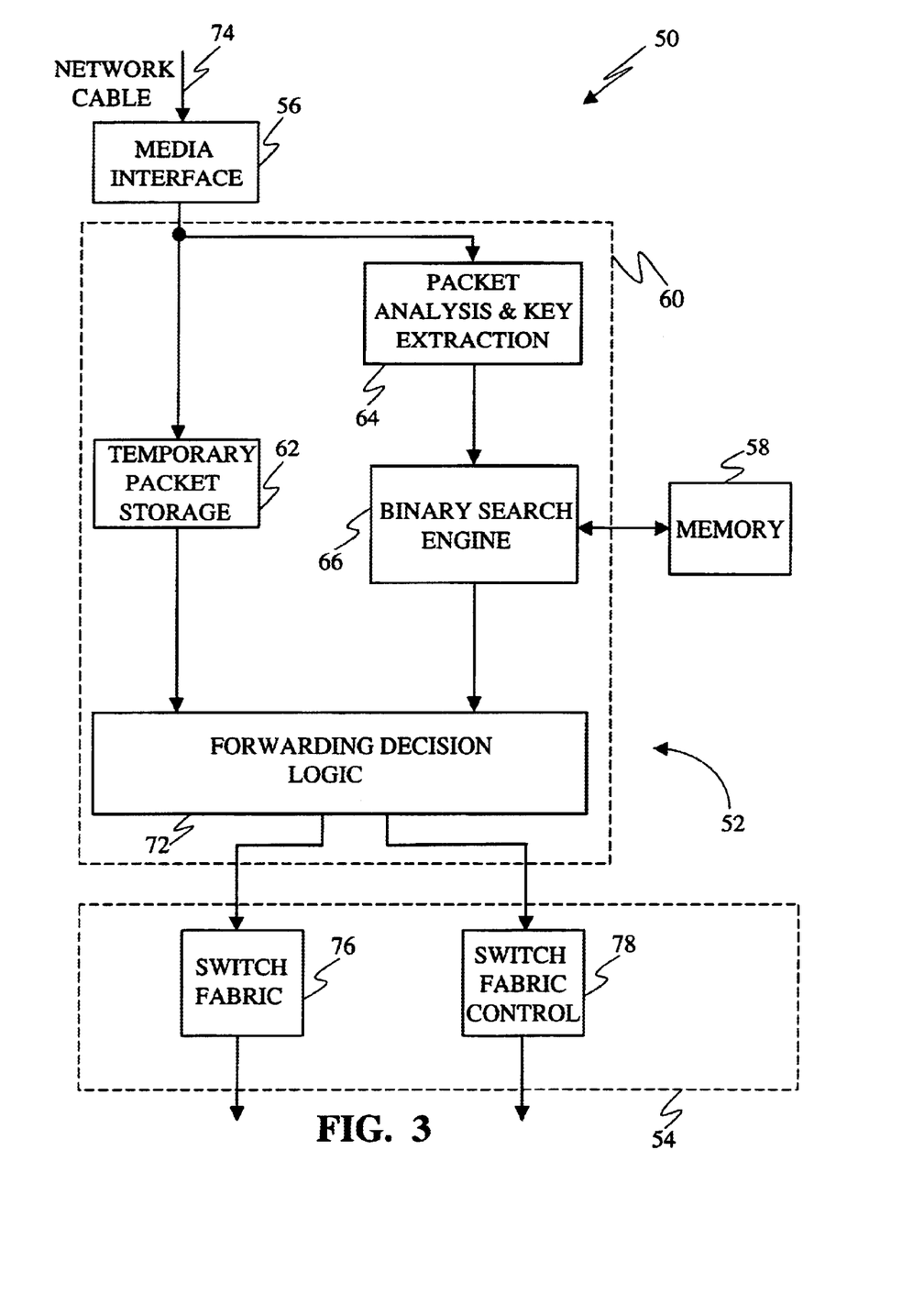
FIG. 3 shows a switching device in accordance with the invention.

FIG. 3 shows a switching device 50 having a port 52 and port intercommunication logic 54. Port 52 includes a media interface 56, a memory 58, and a search engine 60. The search engine 60 includes temporary packet storage 62, packet analysis and key extraction logic 64, an internal binary search engine 66, and forwarding decision logic 72. There are multiple ports (not shown) in switching device 50. One or more ports are located on channel cards (not shown) mounted in a chassis. The number of ports and how the ports and port intercommunication logic 54 are mounted within a chassis are based on the particular application and are not important to the invention.

Media interface 56 connects switching device 50 to a network (not shown) through a network cable 74. The network cable can take a variety of forms (e.g., fiber optic, twisted-pair, coaxial, etc.) depending on the type of network. A variety of network standards and protocols may be used, such as TCP/IP, IPX/SPX, FDDI, ATM, ETHERNET, GIGABIT ETHERNET, FAST ETHERNET, Token Ring, SONET, etc. Other network protocols, standards, and network cables now existing or later developed may be used with the invention, since these particular aspects are not important to the invention. Media interface 56 is a communication link between search engine 60 and the network. Thus, media interface 56 allows search engine 60 to send network frames in any desired format and media interface 56 reformats the frames for the particular network. Similarly, media interface 56 receives network frames from the network and formats the frames so they may be read by search engine 60. The media interface used is based on the particular application and is not important to understanding the invention.

Temporary packet storage 62 within search engine 60 holds the network frame temporarily while other components within the search engine determine where to forward the network frame to, as is further described below. In some circumstances, a decision may be made to not forward the packet at all. In such cases, the network frame is never passed to the port intercommunication logic. Depending on the size of the network frame, the temporary packet storage 62 may hold several network frames, or, alternatively, only a portion of a network frame as it is forwarded to another port.

Packet analysis and key extraction logic 64 extracts information, such as the source and destination addresses from the network frame, and creates a key which is passed to the binary search engine 66. Details on how the binary search engine creates the key are further described below. The packet analysis and key extraction logic 64 may also pass additional information to the binary search engine 66, such as virtual LAN information that comes with the network frame or is derived based on the type of network frame.

Figure 5:
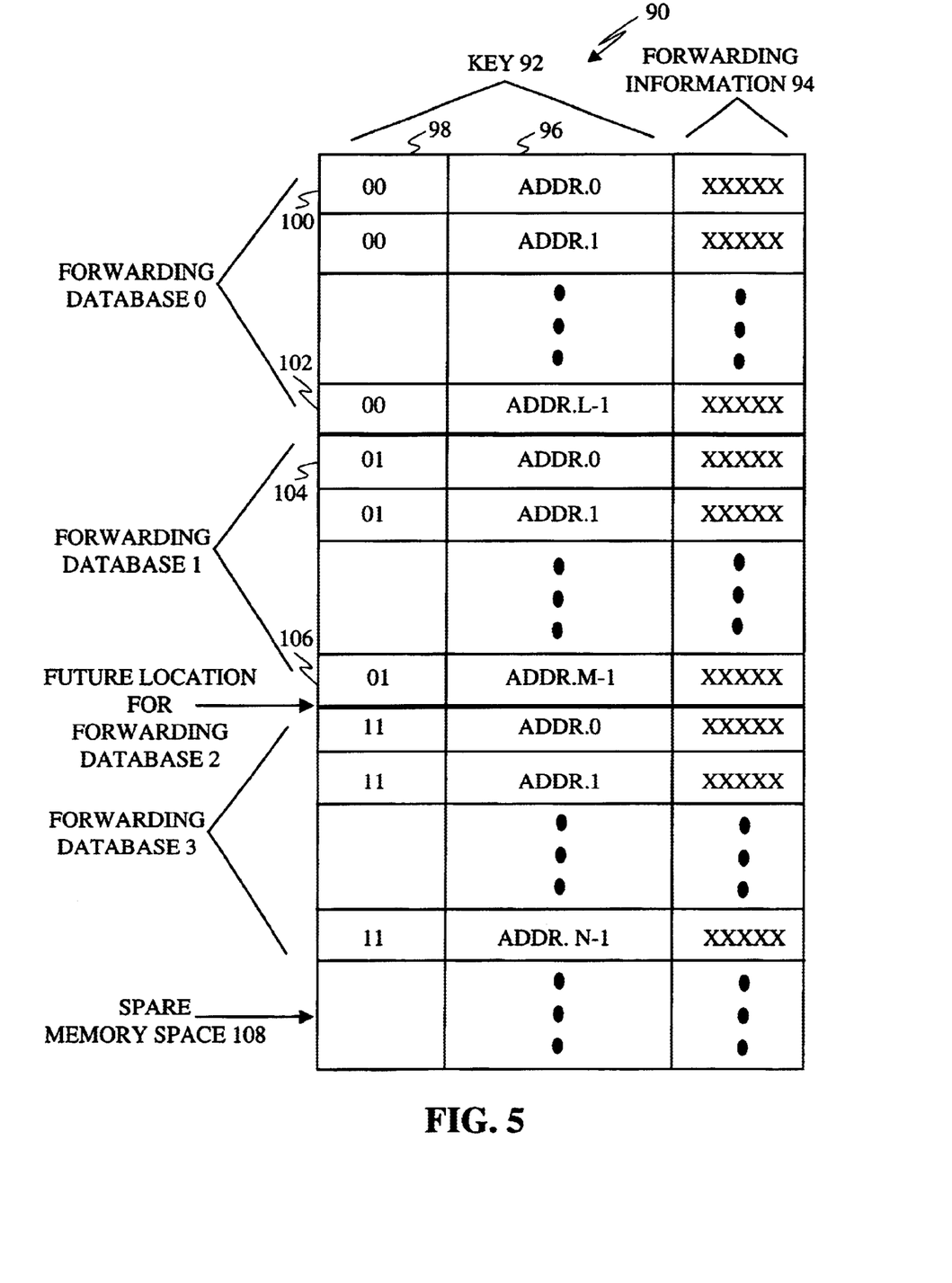
FIG. 5 shows a lookup table in accordance with the invention for storing multiple database formats.

Binary search engine 66 is coupled to memory 58. The memory stores a lookup table that the binary search engine uses for analyzing network frames received from media interface 56. A portion of an example lookup table is shown in FIG. 5 and is further described below. A management processor (not shown) is coupled to search engine 66 and maintains the lookup table in memory 58. Specifically, the management processor may direct the search engine to delete old table entries, insert new table entries and generally maintain the table in sorted order so that the search engine performs searches efficiently and correctly.

After binary search engine 66 completes the binary search, the results are passed to forwarding decision logic 72, which examines the results and applies a predetermined set of rules to determine whether the network frame should be forwarded and which port or ports it should be forwarded to. Forwarding decision logic may also examine the level of priority of the network frame. Higher priority frames are typically forwarded by the switching device 50 before lower priority frames.

When forwarding decision logic determines that a frame is to be forwarded to other ports in switching device 50, it passes the network frame to the port intercommunication logic 54. Port intercommunication logic 54 includes a switch fabric 76 and a switch fabric control 78. Switch fabric 76 can take a variety of forms. For example, the switch fabric can be a cross-bar switch, which is commonly used in telecommunications switching. The cross-bar switch creates a path between a receiving port and a transmitting port so that the network frame may be passed therebetween. A wide variety of cross-bar switches may be used, such as cut-through switches, interim cut-through switches, and store-and-forward switches. Other types of switch fabrics may also be used. For example, switch fabric 76 may also be a central memory using a bus arbitration device and a central bus. Using a shared-memory bus architecture, all ports access a memory pool located locally on a switching module or work group switch. The ports can access the central memory through a common bus when an arbitration device grants it access. Another possible switch fabric that can be used is a parallel access shared-memory architecture. In a parallel access shared memory, all ports share the central memory. However, a bus arbitration scheme is not used. Instead, every port has a dedicated path into and out of the central memory fabric. Therefore, all ports can simultaneously access the centralized memory pool at any time. A wide variety of existing switch fabrics or later developed switch fabrics may also be used. The particular switch fabric and switch fabric control is not of importance to the invention. Indeed, in certain applications of the present invention, the switch fabric control and switch fabric may even be excluded.

Switch fabric control 78 controls network frames as they are passed through the switch fabric. In the case where the switch fabric is a cross-bar switch, the switch fabric control is typically called a scheduler. The scheduler establishes a connection within the cross-bar switch so that a search engine on one port can directly pass a network frame to a search engine on another port. In the case where the switch fabric is a memory, the switch fabric control tells a receive-side search engine where to store the frame in memory. After the frame is stored in memory, the switch fabric control signals a transmitting-side port that the network frame is ready to be transmitted and provides the address of the memory location where the frame is located. The switch fabric control may also provide priority information to the transmitting-side port.

Figure 4:
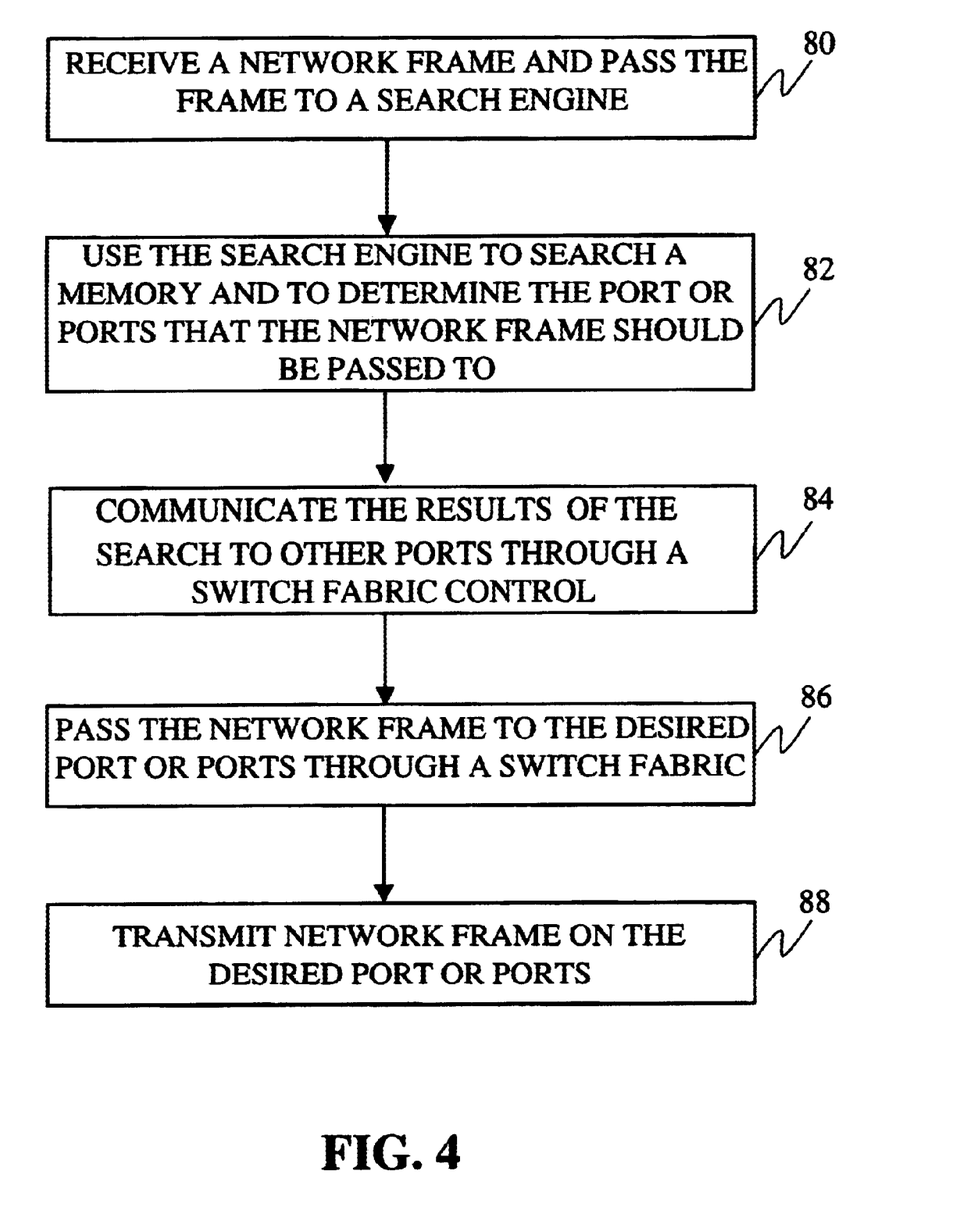
FIG. 4 is a flowchart of a method for forwarding network frames in the switching device of FIG. 3.

FIG. 4 shows a flow chart of a method used by the switching device 50 for forwarding network frames. In step 80, the media interface 56 receives a network frame from the network and passes the frame to search engine 60. The network frame contains a destination address that indicates the ultimate destination for the network frame. In step 82, search engine 60 searches memory 58 to determine whether the destination address from the network frame is located within the lookup table of memory 58. If a network address matches the destination address, forwarding information indicating where the frame should be forward to is also obtained from the lookup table. Assuming that the forwarding information was properly found in the lookup table and the appropriate port was determined, the search engine passes the search results to the forwarding decision logic, which in turn passes the forwarding information to switch fabric control 78 (step 84). In step 86, search engine 60 transfers the network frame through switch fabric 76. If the switch fabric is a cross-bar switch, the switch fabric control 78 establishes the connection in the switch fabric and communicates to search engine 60 when to send the network frame. If the switch fabric is a central memory with or without bus arbitration, the switch fabric control tells search engine 60 where in the switch fabric to store the network frame. Search engine 60 then stores the network frame at the indicated location. The switch fabric control also informs the other ports of where the network frame is stored so that they may properly access it within the switch fabric. Regardless of the technique used with the switch fabric, the network frame is obtained from the switch fabric and transmitted on one or more ports (step 88).

FIG. 5 shows a lookup table 90 in accordance with the invention. The lookup table 90 includes a lookup key field 92 and a forwarding information field 94. The lookup key field 92 is the field used by the binary search engine 66 to search the lookup table. In the illustrated example, the lookup key field includes an address 96 and format identification bits 98. The address 96 may be a network address in accordance with a network protocol, such as a MAC address (48 bits), an IP address (32 bits), an IPV6 address (128 bits), etc. Other network addresses of different lengths also can be used. Additionally, the key can include other information then the address, such as VLAN information, IP type-of-service information, and TCP/UDP application port numbers. The format identification bits 98 are positioned as the most significant bits (MSB) of the key. Although only two bits are shown for the format identification bits 98, any number of bits may be used. The illustrated format identification bits allow for 4 different database formats within a single memory. The databases are listed as forwarding database 0, 1, and 3 and are in different formats, such as MAC, IP, IPV6, etc., although the invention is not limited to any particular formats. Forwarding database 0 has a first database entry 100 with an address generically shown as ADDR. 0, which can be any desired length. For example, if the database format corresponds to a MAC protocol, then ADDR. 0 may be a 48 bit value. The forwarding information 94 corresponding to ADDR. 0 is also shown generically and may include a port number and/or other forwarding information. Like the address, the forwarding information 94 may also be any length. The last database entry 102 for forwarding database 0 is shown having an ADDR. L-1 where L indicates the number of entries in the forwarding database 0 (L can be any positive integer). The forwarding database 0 can be customized for a particular user by changing the number of entries. Thus, the actual memory location for the last entry 102 can dynamically change if a user determines more or less entries are needed in forwarding database 0. Regardless of the number of entries, the format identification bits 98 are constant. The illustrated format identification bits are 00 for all entries within forwarding database 0. As described further below, the format identification bits effectively separate the different forwarding databases into groups.

The forwarding database 1 has a first entry 104 shown generically as ADDR. 0 and a last entry ADDR. M-1 where forwarding database 1 contains M entries (M is a positive integer). The number of entries M in forwarding database 1 can also dynamically change and can be a number differing from the number of entries in forwarding databases 0 and 3. The format identification bits for forwarding database 1 are 01 and distinguish forwarding database 1 from the other forwarding databases in the lookup table 90. The format identification bits 98 also allow each individual forwarding database in the lookup table to be sorted in ascending or descending order, while the overall lookup also is stored in sorted order to facilitate searching.

Forwarding database 3 has a similar format to those described above with N entries where N is any positive integer that can dynamically change.

Notably, there is no illustrated forwarding database 2. This again illustrates one aspect of the invention where multiple forwarding databases are stored in the single lookup table 90 and the number of entries in each of the forwarding databases can dynamically change without wasted memory space. Thus, if a new database format is desired, new entries can be used by moving forwarding database 3 into spare memory address space 108 to open entries up for forwarding database 2. The format identification bits 10 for forwarding database 02 are prepended as the MSB of the addresses.

Thus, each forwarding database can dynamically change in size with new entries added or deleted as desired. Also, memory from one forwarding database can be deleted and reallocated to another forwarding database as needed. The format identification bits allow a single search engine to search the entire lookup table 90 without regard to the formats of the individual databases. The format identification bits allow the lookup table to remain in sorted order while simultaneously separating the lookup table into sections of forwarding databases having different formats.

Figure 6:
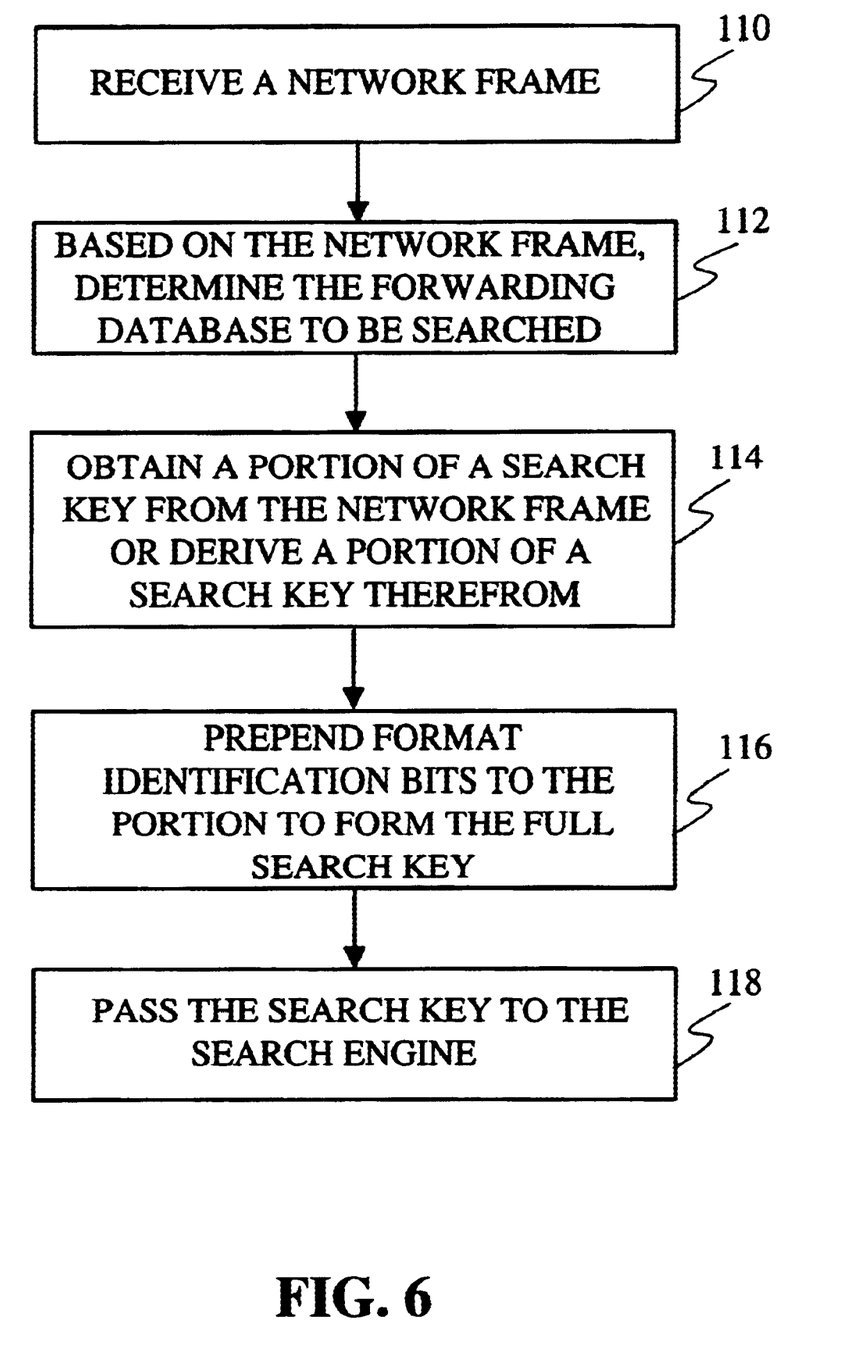
FIG. 6 shows a flowchart of a method for searching the lookup table of FIG. 5.

FIG. 6 shows a flowchart of a method for searching disparate database formats that only requires one search engine and one memory. In step 110, a network frame is received in the media interface 56 (See FIG. 3). Based on the protocol associated with the network frame, the packet analysis and key extraction circuit 64 determines which forwarding database should be searched for the frames forwarding information (step 112). For example, if a network frame includes a MAC address other than that of the switching device 50, then the search key will be located within a forwarding database associated with MAC addresses. In step 114, a portion of the search key is obtained explicitly from the network frame or is derived therefrom based on the characteristics of the network frame (e.g., what port the frame is received on). For example, a destination address may be identified in the network frame, and such an address can be used within the search key. In step 116, the search key is formed by prepending format identification bits to the portion of the search key obtained in step 114. Which format identification bits are prepended relates to the determination made in step 112. The full search key is then passed to the search engine to conduct the search.

Thus, the invention allows any number of disparate databases within a single memory. The databases are differentiated based on the format identification bits. Each database can be of an arbitrary size and the size is easily modified by inserting or deleting an entry. Unused forwarding databases need not be present in memory wasting valuable memory space. However, if it is desired to add a database to the memory, unused format identification bits can be used to add the database. Also, the single memory scheme places no demands on the complexity of the search engine since it views the entire memory as a single sorted database.

Having described and illustrated the principles of our invention with reference to preferred embodiments thereof, it will be apparent that these embodiments can be modified in arrangement and detail without departing from the principles of the invention.

For example, although the port 52 is shown as including separate components, such components can be formed in a single integrated circuit. Additionally, other circuit components, such as the port intercommunication logic 54 can also be included in the same integrated circuit as the port.

Additionally, any of the components of the switching device can be performed by hardware, software, or a combination thereof. The invention should not be limited to the particular technique (whether hardware or software) for carrying out the methods and apparatus described herein. For example, the search engine can be a microprocessor running software or an ASIC where the searches are performed in hardware.

Still further, although the lookup table is shown as containing table entries with multiple fields, the lookup table can be any type of data structure or array that stores data.

Yet further, the network packets can include any kind of data including video images, voice data during a phone call, a document, etc.

Still further, when a port receives a network frame, it can analyze the source/destination address (at layer two and layer three) and it can also analyze other frame or data payload information including information from the frames layer 2, 3, or 4 headers. Such information includes the frames source port, VLAN, encapsulation type, routing protocol type, IP type-of-service, and TCP/UDP port numbers.

Still yet further, the present invention may be applied to LAN's, WAN's, the Internet, Intranets, telephone networks, or any other network.

Additionally, although the lookup table is described as containing network addresses, the lookup table may include other keys. A key may include a network address exclusively or in combination with additional information, such as the frames VLAN or IP type-of-service information. Alternatively, a key may include lookup information other than network addresses. Additionally, the switching device may receive network frames that include search keys. Alternatively, the search key may be derived from the network frame. For example, the search engine may use characteristics of the network frame, such as what port it was received on, to derive the search key. The search key, which is either explicitly included in the network frame or derived therefrom, is compared to the lookup table which includes lookup keys.

Additionally, although a binary search engine is used in the illustrated embodiment, other search engines can be used instead, including linear search engines, CAM, binary radix trees, hashing, etc.

In view of the many possible embodiments to which the principles or invention may be applied, it should be recognized that the illustrated embodiment is only a preferred example of the invention and should not be taken as a limitation on the scope of the invention. Rather, the invention is defined by the following claims. We therefore claim as the invention all such embodiments that come within the scope of these claims.

We claim:

1. In a switching device having a plurality of ports, each port having a plurality of forwarding databases wherein each forwarding database has an associated database format compatible with at least one format of a network frame, a method of transmitting the network frame within a port comprising the steps of:
    (a) receiving the network frame wherein the network frame has a plurality of characteristics comprising a destination address and a format property;
    (b) determining a partial search key from the destination address of the network frame;
    (c) determining one or more format identification bits from the format property of the network frame wherein the determined one or more format identification bits are associable with one of the plurality of forwarding databases; and
    (d) generating a full search key by concatenating, to the partial search key, the one or more format identification bits as the most significant bits of a fill search key;
    (e) identifying a forwarding database associated with the most significant bits of the full search key;
    (f) searching a plurality of forwarding information entries, according to the full search key, within the identified forwarding database;
    (g) determining, by the search engine, at least one destination port from the searched forwarding information entries;
    (h) storing the network frame within a switch fabric; and
    (i) transmitting the network frame from the switch fabric via the at least one determined port.

2. The method of claim 1 further comprising the steps, preceding the transmitting step, of establishing a connection in the switch fabric and communicating a network frame send signal wherein the switch fabric is a cross-bar switch.

3. The method of claim 1 wherein the step of storing further comprises the steps of designating a network frame storage location within the switch fabric, storing the network frame at the designated location within the switch fabric, and transmitting, by the switch fabric, the network frame location within the switch fabric to the plurality of ports.

4. The method of claim 1 wherein the plurality of forwarding databases is stored in dynamically allocated memory of a memory device.

5. The method of claim 1 wherein the plurality of forwarding databases is contained within a single memory device.

6. The method of claim 1 wherein the at least one destination port determined by the search engine further includes a null destination.

7. The method of claim 1 comprising the step, preceding the transmitting step, of communicating the determined port to the remaining at least one destination port via the switch fabric.

8. The method of claim 1 wherein at least one forwarding database comprises forwarding entries supporting an Internet Protocol version 4(IPv4) protocol format.

9. The method of claim 1 wherein at least one forwarding database comprises forwarding entries supporting an Internet protocol version 6 (IPv6) protocol fromat.

10. The method of claim 1 wherein at least one forwarding database comprises forwarding entries supporting a Media Access Control (MAC) format.

11. A method of routing a network frame from a switching device comprising a plurality of ports and a plurality of forwarding databases, the method comprising the steps of:

(a) receiving a network frame comprising a network destination address and a network frame protocol;

(b) extracting one or more format identification bits from the network frame protocol;

(c) generating a search key from the network destination address of the network frame;

(d) selecting a forwarding database from the plurality of forwarding databases using said one or more format identification bits, wherein the selected forwarding database comprises forwarding information entries characterized by a common network frame protocol, the network frame protocol of the forwarding information entries of each forwarding database being different than the network frame protocol of the forwarding information entries of every other forwarding database;

(e) searching the selected forwarding database with the search key;

(f) identifying at least one destination port of the plurality of ports from the forwarding information entries of the selected forwarding database; and (g) transmitting the network frame towards the at least one destination port;

wherein the search for the destination port is limited to one or more contiguous forwarding information entries within the selected forwarding database of the plurality of forwarding databases.

12. The method of claim 11, wherein one or more of the plurality of forwarding databases comprises forwarding information entries characterized by a network frame protocol selected from the group consisting of: IPv4, IPv6, IPX, and Appletalk.

13. The method of claim 12, wherein the forwarding information entries of a first forwarding database comprise IPv4 destination addresses and an associated port identifier, and the forwarding information entries of a second forwarding database comprise IPv6 destination addresses and an associated port identifier.

14. The method of claim 11, wherein the plurality of forwarding databases are sequentially ordered within a single memory.

15. The method of claim 14, wherein the step of generating a search key includes the step of prepending the one or more format identification bits from the network frame protocol to the partial search key.

16. The method of claim 15, wherein the step of selecting a forwarding database from the plurality of forwarding databases occurs automatically due to the presence of the one or more format identification bits.

* * * * *